US011527056B2

United States Patent
Yang et al.

(10) Patent No.: US 11,527,056 B2
(45) Date of Patent: Dec. 13, 2022

(54) IMAGE AND DATA PROCESSING METHODS AND APPARATUSES

(71) Applicant: ALIBABA GROUP HOLDING LIMITED, Grand Cayman (KY)

(72) Inventors: Lingbo Yang, Hangzhou (CN); Pan Wang, Hangzhou (CN); Peiran Ren, Hangzhou (CN); Xuansong Xie, Beijing (CN); Zhanning Gao, Beijing (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 113 days.

(21) Appl. No.: 17/186,493

(22) Filed: Feb. 26, 2021

(65) Prior Publication Data

US 2021/0271919 A1    Sep. 2, 2021

(30) Foreign Application Priority Data

Feb. 28, 2020   (CN) .......................... 202010130948.4

(51) Int. Cl.
*G06V 10/44*    (2022.01)
*G06T 7/40*    (2017.01)
(Continued)

(52) U.S. Cl.
CPC ......... *G06V 10/44* (2022.01); *G06Q 30/0277* (2013.01); *G06Q 30/0643* (2013.01);
(Continued)

(58) Field of Classification Search
CPC ................... G06T 11/001; G06T 11/60; G06T 2207/20084; G06T 2207/30196;
(Continued)

(56) References Cited

U.S. PATENT DOCUMENTS 9,594,977 B2    3/2017    Lin et al.
10,424,087 B2    9/2019    Risser
(Continued)

FOREIGN PATENT DOCUMENTS

CN    104614766 B    10/2017
CN    107924579 A    4/2018
(Continued)

OTHER PUBLICATIONS

Tengteng95, "Pose-Transfer," retrieved on Mar. 1, 2021, https://github.com/tengteng95/Pose-Transfer https://github.com/NVlabs/FUNIT.
(Continued)

*Primary Examiner* — Manuchehr Rahmjoo (57) ABSTRACT

The specification discloses image and data processing methods and apparatuses. The method includes: obtaining a source pose and texture information according to a source image; obtaining a first synthetic image according to the source image, a target pose, and the source pose; obtaining a residual map according to the texture information and the first synthetic image; and obtaining a second synthetic image according to the first synthetic image and the residual map. The specification resolves the technical problem of lacking a sense of reality in a synthetic image due to loss of texture details in feature extraction during character action transfer in the existing technologies.

17 Claims, 6 Drawing Sheets

(51) Int. Cl.
*G06Q 30/02* (2012.01)
*G06T 11/60* (2006.01)
*G06Q 30/06* (2012.01)
*G06T 7/73* (2017.01)

(52) U.S. Cl.
CPC .................. *G06T 7/40* (2013.01); *G06T 7/73* (2017.01); *G06T 11/60* (2013.01)

(58) Field of Classification Search
CPC ......... G06T 2210/16; G06T 7/40; G06T 7/73; G06T 7/75; G06V 10/44; G06V 10/764; G06V 10/82; G06V 40/10
See application file for complete search history.

(56) References Cited

U.S. PATENT DOCUMENTS

| | | | |
|---|---|---|---|
| 10,621,705 B2 | 4/2020 | Michel et al. | |
| 10,679,351 B2 | 6/2020 | El-khamy et al. | |
| 2008/0205712 A1 | 8/2008 | Ionita et al. | |
| 2010/0008424 A1 | 1/2010 | Pace | |
| 2010/0149917 A1 | 6/2010 | Imhof et al. | |
| 2017/0188002 A1 | 6/2017 | Chan et al. | |
| 2019/0035149 A1* | 1/2019 | Chen | G06T 17/20 |

FOREIGN PATENT DOCUMENTS

| | | |
|---|---|---|
| CN | 108475330 A | 8/2018 |
| CN | 110378985 A | 10/2019 |
| CN | 111046939 A | 4/2020 |
| EP | 2556490 B1 | 2/2018 |
| JP | 2005078646 A | 3/2005 |
| JP | 2010526455 A | 7/2010 |
| JP | 5049356 B2 | 10/2012 |
| WO | 2020182033 A1 | 9/2020 |

OTHER PUBLICATIONS

"OpenPose," CMU Perceptual Computing Lab, retrieved on Mar. 1, 2021, https://github.com/CMU-Perceptual-Computing-Lab/openpose.

* cited by examiner

IMAGE AND DATA PROCESSING METHODS AND APPARATUSES

CROSS-REFERENCE TO RELATED APPLICATION

This application is based on and claims priority to and benefits of Chinese Patent Application No. 202010130948.4, filed with the China National Intellectual Property Administration (CNIPA) on Feb. 28, 2020. The entire content of the above-identified application is incorporated herein by reference.

TECHNICAL FIELD

The specification relates to the field of applications of Internet technologies, and in particular, to image and data processing methods and apparatuses.

BACKGROUND

Types of online products, and modes of consumptions and experiences are increasingly diversified with a continuously expanding e-commerce scale. As a result, conventional advertising manners based on the text description and static photos of a commodity can no longer fully display highlights of the commodity and user experience effects. The production of a professional advertisement video of a commodity not only takes a large amount of time, but also usually requires the participation of professionals (for example, fashion models), thereby placing a huge burden on individual merchants and small and medium-sized enterprises for promoting their products.

Figure 1:
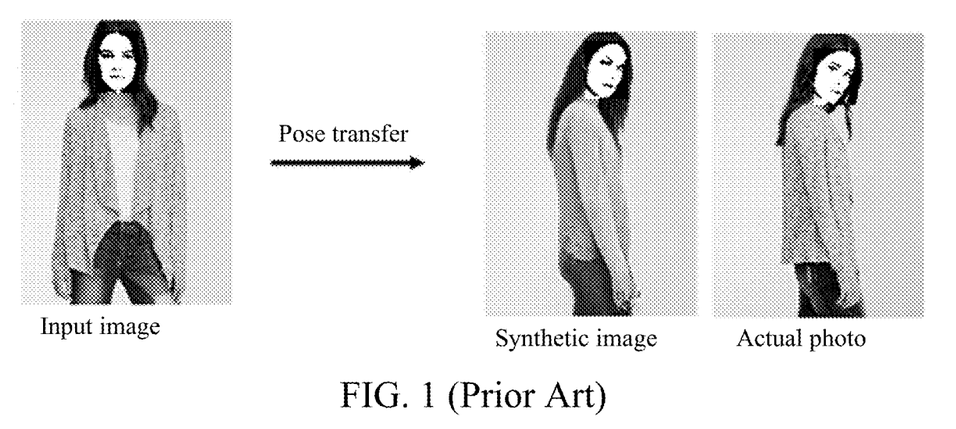
FIG. 1 is a schematic diagram of character action transfer in the existing technologies.

In a currently disclosed character action transfer method, subtle texture details such as hair and clothing patterns are usually easy to be lost during feature extraction, resulting in an excessively smooth synthetic image and a lack of a sense of reality, as shown in FIG. 1. FIG. 1 is a schematic diagram of character action transfer in existing technologies. In FIG. 1, when a synthetic image is compared with an actual photo, a biggest difference between the synthetic image and the actual photo is that texture (patterns) on clothing and character features (for example, a hair style of a model) are not clearly displayed on the synthetic image.

Currently, no effective solution has been provided for the problem of lacking a sense of reality in a synthetic image due to the loss of texture details in the feature extraction during the character action transfer in the existing technologies.

SUMMARY

Embodiments of the specification provide image and data processing methods and apparatuses, to at least solve the technical problem of lacking a sense of reality in a synthetic image due to loss of texture details in feature extraction during character action transfer in the existing technologies.

According to an aspect of an embodiment of the specification, an image processing method is provided, which includes: obtaining a source pose and texture information according to a source image; obtaining a first synthetic image according to the source image, a target pose, and the source pose; obtaining a residual map according to the texture information and the first synthetic image; and obtaining a second synthetic image according to the first synthetic image and the residual map.

In an embodiment, the obtaining a source pose and texture information according to a source image includes: obtaining a source pose of the source image through pose estimation according to the source image; and obtaining texture information of the source image by performing feature extraction on the source image.

In an embodiment, the obtaining a first synthetic image according to the source image, a target pose, and the source pose includes: obtaining a content feature map according to the source image, the target pose, and the source pose; and obtaining the first synthetic image according to the content feature map.

In an embodiment, the obtaining a residual map according to the texture information and the first synthetic image includes: performing normalization processing according to texture code and the content feature map, to obtain the residual map by: performing deep learning on the texture code, normalizing the texture code on which deep learning has been performed and the content feature map, and then performing reconstruction, to obtain the residual map, where the residual map includes contour features and surface texture details in the source image.

Further, in an embodiment, the contour features include at least one of: a human face, an animal head, a body feature, or an appearance feature of an article; and the surface texture details include commodity surface texture details, where the commodity surface texture details include at least one of: clothing texture details, accessory texture details, or tool texture details.

In an embodiment, the obtaining a second synthetic image according to the first synthetic image and the residual map includes: performing superposition according to the first synthetic image and the residual map, to obtain the second synthetic image.

Further, the performing superposition according to the first synthetic image and the residual map, to obtain the second synthetic image includes: according to the contour features and the surface texture details in the source image in the residual map, filling the contour features and the surface texture details at positions corresponding to the contour features and the surface texture details in the first synthetic image, to obtain the second synthetic image, where the second synthetic image has the contour features and the surface texture details in the source image.

According to another aspect of an embodiment of the specification, a data processing method is further provided, which includes: receiving a source image uploaded by a user; obtaining a source pose and texture information of the source image according to the source image; performing pose transfer according to the source image, a target pose, and the source pose, to obtain a first synthetic image; performing feature enhancement according to the texture information, to obtain a residual map, where the residual map includes contour features and surface texture details in the source image; filling the first synthetic image with the contour features and the surface texture details in the residual map, to generate a second synthetic image; and determining the second synthetic image as a display image for display.

According to still another aspect of an embodiment of the specification, an image processing method is provided, which includes: receiving a source image uploaded by a user; generating a first synthetic image according to a source pose of the source image, and generating a residual map according to texture information of the source image; obtaining a second synthetic image according to the first synthetic image and the residual map; and generating an image set or video data according to the second synthetic image.

In an embodiment, the image set or the video data is applicable to online fitting effect display or advertisement page display.

According to yet another aspect of an embodiment of the specification, an image obtaining method is further provided, which includes: uploading a source image; receiving an image set or video data returned according to the source image, where a first synthetic image and a residual map are generated according to a source pose and texture information of the source image; a second synthetic image is obtained according to the first synthetic image and the residual map; and the image set or the video data is obtained according to the second synthetic image.

According to an aspect of another embodiment of the specification, an image processing apparatus is further provided, which includes: a first obtaining module, configured to obtain a source pose and texture information according to a source image; a first synthesizing module, configured to obtain a first synthetic image according to the source image, a target pose, and the source pose; a second obtaining module, configured to obtain a residual map according to the texture information and the first synthetic image; and a second synthesizing module, configured to obtain a second synthetic image according to the first synthetic image and the residual map.

According to another aspect of another embodiment of the specification, a data processing apparatus is further provided, which includes: a receiving module, configured to receive a source image uploaded by a user; an obtaining module, configured to obtain a source pose and texture information of the source image according to the source image; a first image processing module, configured to perform pose transfer according to the source image, a target pose, and the source pose, to obtain a first synthetic image; a second image processing module, configured to perform feature enhancement according to the texture information, to obtain a residual map, where the residual map includes contour features and surface texture details in the source image; a synthesizing module, configured to fill the first synthetic image with the contour features and the surface texture details in the residual map, to generate a second synthetic image; and a display module, configured to determine the second synthetic image as a display image for display.

According to still another aspect of another embodiment of the specification, an image processing apparatus is further provided, which includes: a receiving module, configured to receive a source image uploaded by a user; a first generation module, configured to generate a first synthetic image according to a source pose of the source image, and generate a residual map according to texture information of the source image; an obtaining module, configured to obtain a second synthetic image according to the first synthetic image and the residual map; and a second generation module, configured to generate an image set or video data according to the second synthetic image.

According to yet another aspect of another embodiment of the specification, an image obtaining apparatus is further provided, which includes: an upload module, configured to upload a source image; and a receiving module, configured to receive an image set or video data returned according to the source image, where a first synthetic image and a residual map are generated according to a source pose and texture information of the source image; a second synthetic image is obtained according to the first synthetic image and the residual map; and the image set or the video data is obtained according to the second synthetic image.

According to an aspect of still another embodiment of the specification, a storage medium is further provided, where the storage medium includes a stored program, where the program, when run, controls a device including the storage medium to perform the foregoing image or data processing method.

According to an aspect of another embodiment of the specification, a non-transitory computer-readable storage medium for image processing, configured with instructions executable by one or more processors to cause the one or more processors to perform operations comprising: obtaining a source pose and texture information according to a source image; obtaining a first synthetic image according to the source image, a target pose, and the source pose; obtaining a residual map according to the texture information and the first synthetic image; and obtaining a second synthetic image according to the first synthetic image and the residual map.

According to an aspect of another embodiment of the specification, a system for image processing, comprising a processor and a non-transitory computer-readable storage medium storing instructions executable by the processor to cause the system to perform operations comprising: obtaining a source pose and texture information according to a source image; obtaining a first synthetic image according to the source image, a target pose, and the source pose; obtaining a residual map according to the texture information and the first synthetic image; and obtaining a second synthetic image according to the first synthetic image and the residual map.

According to an aspect of still another embodiment of the specification, a processor is further provided, where the processor is configured to run a program, and the program, when run, performs the foregoing image or data processing method.

In the embodiments of the specification, an input source image is reused for extracting texture code, a content feature map obtained according to the source image, a target pose, and a source pose is reused for providing guidance including spatial information, and the source pose and texture information are obtained according to the source image. A first synthetic image is obtained according to the source image, the target pose, and the source pose. A residual map is obtained according to the texture information and the first synthetic image. A second synthetic image is obtained according to the first synthetic image and the residual map. The method and apparatus may improve missing/weakened detail information in a coarse image, thereby achieving a technical effect of improving a sense of reality of a synthetic image, and further resolving the technical problem of lacking a sense of reality in a synthetic image due to loss of texture details in feature extraction during character action transfer in the existing technologies.

BRIEF DESCRIPTION OF THE DRAWINGS

Accompanying drawings described herein are used to provide further understanding about the specification, and constitute a portion of the specification. Embodiments of the specification and descriptions thereof are used to explain the specification, and do not constitute limitations on the specification.

DETAILED DESCRIPTION

To make a person skilled in the art better understand the solutions of the specification, the technical solutions in the embodiments of the specification will be clearly and completely described below with reference to the accompanying drawings in the embodiments of the specification. The described embodiments are merely some rather than all of the embodiments of the specification. All other embodiments obtained by a person of ordinary skill in the art based on the embodiments of the specification without creative efforts shall fall within the protection scope of the specification.

The terms such as "first" and "second" in this specification, the claims, and the foregoing accompanying drawings of the specification are to distinguish between similar objects rather than describe a particular sequence or a chronological order. The data termed in such a way are interchangeable in proper circumstances so that the embodiments of the specification described herein can be implemented in other orders than the order illustrated or described herein. Moreover, the terms "include", "contain", and any other variants are non-exclusive inclusion, for example, a process, a method, a system, a product, or a device including a list of operations or units that is not limited to expressly listed steps or units, but may include other steps or units not expressly listed or inherent to such a process, a method, a system, a product, or a device.

Technical terms involved in the specification include:

Character pose transfer: synthesizing an image or a video of a character with a new pose according to a given character image and guiding information of a target pose.

Embodiment 1

According to the embodiments of the specification, an embodiment of an image processing method is provided. Steps shown in a flowchart in the accompanying drawing may be performed, for example, in a computer system with a set of computer executable instructions. Although a logical order is shown in the flowchart, in some embodiments, the shown or described steps may be performed in an order different from the order in the flowchart.

Figure 2:
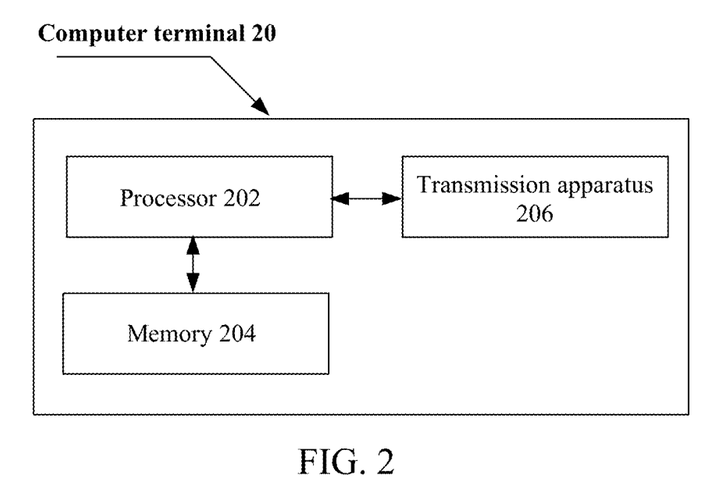
FIG. 2 is a block diagram of a hardware structure of a computer terminal of an image processing method, according to an embodiment of the specification.

The method embodiment provided in Embodiment 1 of the specification may be executed on a mobile terminal, a computer terminal, or a similar computing apparatus. In an example that the method embodiment is executed on a computer terminal, FIG. 2 is a block diagram of a hardware structure of a computer terminal of an image processing method, according to an embodiment of the specification. As shown in FIG. 2, a computer terminal 20 may include one or more processors 202 (only one is shown in the figure), a memory 204 configured to store data, and a transmission apparatus 206 configured to perform a communication function. The processors 202 may include, but are not limited to, processing apparatuses such as microprocessors MCU or programmable logical devices FPGA. A person of ordinary skill in the art may understand that the structure shown in FIG. 2 is only for illustration, and does not limit the structure of the foregoing electronic apparatus. For example, the computer terminal 20 may include more or fewer components than those shown in FIG. 2, or have a configuration different from that shown in FIG. 2.

The memory 204 may be configured to store a software program and modules of application software, such as a program instruction/module corresponding to the image processing method in the embodiments of the specification. The processor 202 runs the software program and modules stored in the memory 204, to execute various function applications and data processing, that is, implement the foregoing image processing method of the applications. The memory 204 may include a high-speed random access memory, and may also include a nonvolatile memory, for example, one or more magnetic storage devices, flash memories, or other nonvolatile solid-state memories. In some embodiments, the memory 204 may further include memories dispose remotely from the processor 202, and these remote memories may be connected to the computer terminal 20 through a network. The network may include, but are not limited to, the Internet, an intranet, a local area network, a mobile communications network, and a combination thereof.

The transmission apparatus 206 is configured to receive or send data through a network. The foregoing network may include a wireless network provided by a communication provider of the computer terminal 20. In an embodiment, the transmission apparatus 206 includes a network interface controller (NIC), which may be connected to another network device through a base station so as to communicate with the Internet. In an embodiment, the transmission apparatus 206 may be a radio frequency (RF) module, which is configured to communicate with the Internet in a wireless manner.

Figure 3:
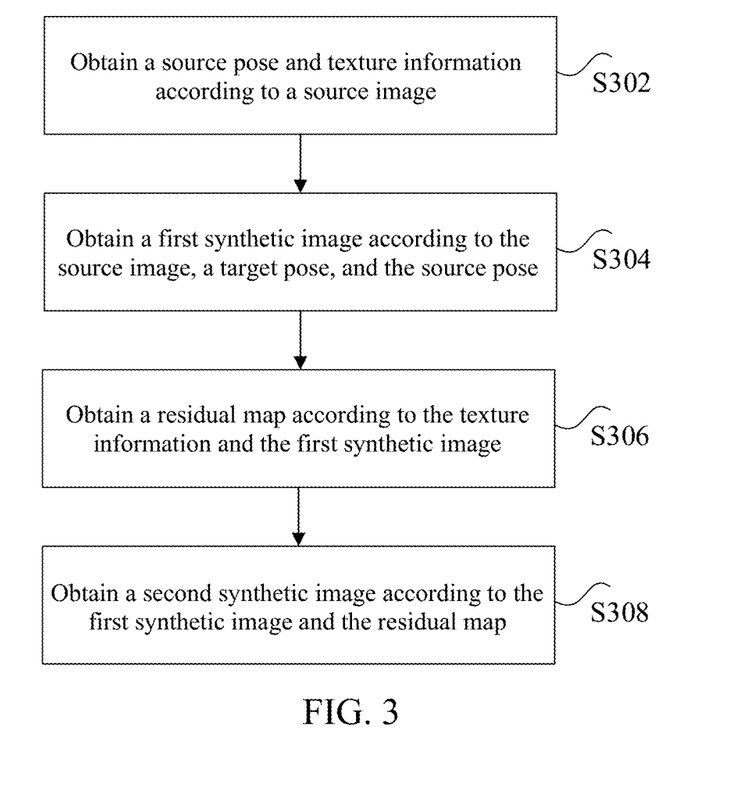
FIG. 3 is a flowchart of an image processing method, according to Embodiment 1 of the specification.

In the foregoing operating environment, the specification provides an image processing method shown in FIG. 3. FIG. 3 is a flowchart of an image processing method, according to Embodiment 1 of the specification. The image processing method provided in this embodiment of the specification includes the following steps.

Step S302: Obtain a source pose and texture information according to a source image.

In the foregoing step S302 of the specification, after a source image uploaded by a user is obtained, a source pose of the source image is obtained through a pose estimation according to the source image, and texture information is obtained by performing a feature extraction on the source image.

Step S304: Obtain a first synthetic image according to the source image, a target pose, and the source pose.

In the foregoing step S304 of the specification, the source image in step S302 is reused. A content feature map is obtained by encoding according to the source image, the source pose obtained according to the source image in step S302, and a pre-obtained target pose. The encoding process may be as follows: an input includes two branches, one branch is a source image I_s, and the other branch is a source pose P_s combined with a target pose P_t. The two branches are independently pre-processed to obtain initial codes, and then are both input into a PATN module for information fusion and mutual guiding, and a content feature map is finally output.

Decoding is performed based on the content feature map, to obtain a coarse image, that is, the first synthetic image in this embodiment of the specification. The process of decoding based on the content feature map to obtain a coarse image may be as follows. After at least one layer of convolution and upsampling, intermediate features obtained through learning from a convolutional network are fused, and a spatial size of a feature map is made consistent with an input image. Finally, an output is compressed to a range of [−1, 1], and then transformed to an RGB value ranging from 0 to 255 for display, to obtain the coarse image.

Step S306: Obtain a residual map according to the texture information and the first synthetic image.

In the foregoing step S306 of the specification, in the process of obtaining the residual map, two obtaining manners are provided in this embodiment of the specification:

Manner 1: performing normalization processing based on the texture information obtained in step S302 and the content feature map obtained in step S304, and recovering the features extracted in a convolutional neural network into an image through reconstruction, to obtain a residual map. The recovering the features extracted in the convolutional neural network into an image through reconstruction may be: recovering the features extracted in the convolutional neural network into the image through convolution in combination with upsampling, or through deconvolution. The reconstruction manner in this embodiment of the specification is merely described by using the foregoing embodiment as an example, and is subject to implementing the image processing method provided by this embodiment of the specification. The specific reconstruction manner is not limited herein.

Manner 2: performing normalization processing based on the texture information obtained in step S302 and the first synthetic image obtained in step S304, to obtain a residual map.

The residual map is an image including contour features and surface texture details in the source image.

Step S308: Obtain a second synthetic image according to the first synthetic image and the residual map.

In the foregoing step S308 of the specification, based on the first synthetic image obtained in step S304 and the residual map obtained in step S306, the residual map is superposed to the coarse image, and a repaired refined image is output. The refined image may be an image obtained by adding the contour features and the surface texture details of the source image by using the residual map on the coarse image, that is, a second synthetic image in this embodiment of the specification. In this embodiment of the specification, compared with the refined image, the coarse image lacks contour features and surface texture details in the residual map.

Figure 4A:
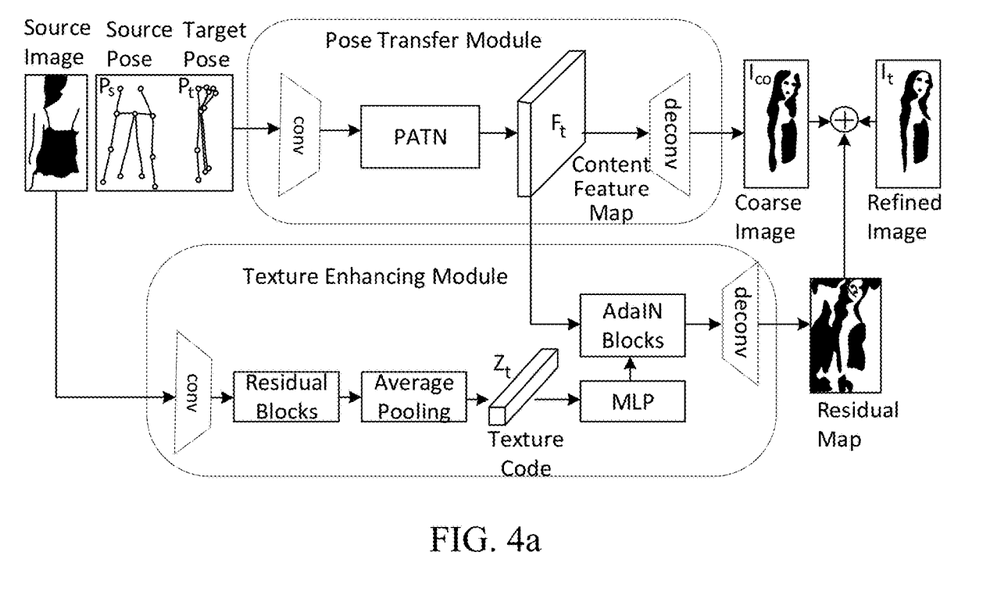
FIG. 4a to FIG. 4b are schematic diagrams of obtaining a second synthetic image according to a source image in the image processing method according to Embodiment 1 of the specification.
Figure 4B:
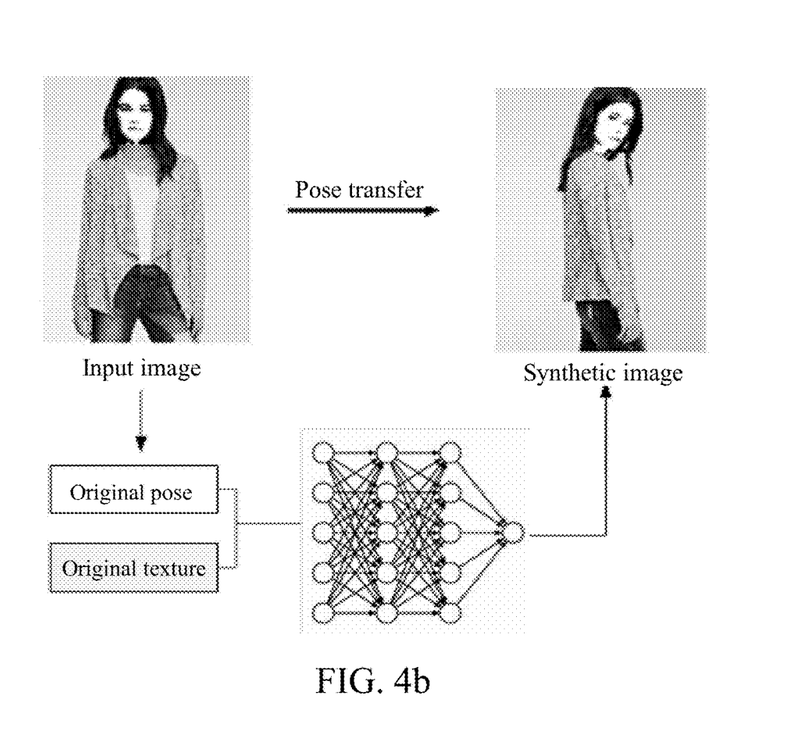

In conclusion, with reference to step S302 to step S308, each of FIG. 4a to FIG. 4b is a schematic diagram of obtaining a second synthetic image according to a source image in the image processing method according to Embodiment 1 of the specification. As shown in FIG. 4a to FIG. 4b, the image processing method provided by this embodiment of the specification may be applicable to the field of e-commerce. For example, on a shopping website side, a seller uploads a commodity picture. The commodity picture may be a picture of a model wearing to-be-sold clothing, but the picture may not meet requirements of generating advertising text. In order to generate the advertising text, the clothing picture may be the source image in this embodiment of the specification. After the source image is obtained, based on the requirements of the advertising text, a target pose is obtained. Therefore, according to the source image, first, a source pose of the source image is obtained by using a pose estimation algorithm. Then, encoding is performed by using a pose transfer module and based on the source image, the target pose, and the source pose, to obtain a content feature map. The content feature map is decoded by using a decoder, to obtain a coarse image, that is, a first synthetic image in this embodiment of the specification.

In addition, in the image processing method provided by this embodiment of the specification, features are extracted through a deep learning network by using the clothing picture, to obtain texture code (that is, texture information in this embodiment of the specification is embodied by using the texture code). Using a texture enhancing module, based on the texture code, and performing adaptive instance normalization (AdaIN) on the content feature map, a residual map including a human face and clothing texture details is obtained after deconvolution (deconv).

The coarse image is combined with the residual map, for example, the residual map is superposed onto the coarse image, and a repaired refined image is output, that is, a second synthetic image in this embodiment of the specification is obtained.

That is, in the foregoing manner, on the shopping website side, after the seller uploads the clothing picture, more pictures of the model wearing the to-be-sold clothing are obtained by using character pose transfer, to automatically synthesize a "seller show" video from static character images, realize transformation of e-commerce publicity "from static to dynamic", enhance advertising and display abilities of small and medium-sized merchants, promote updating and upgrading of e-commerce platforms, and improve advertising means and product value mining.

As shown in FIG. 4a to FIG. 4b, the target pose is represented by a skeleton drawing, but in actual application, representation of pose features includes but is not limited to a 2D/3D skeleton, a human body segmentation map (global or local), parametric/nonparametric three-dimensional human body model (including point cloud, polygonal mesh, and voxel).

As shown in FIG. 4b, based on image processing procedures of FIG. 4a and FIG. 4b, by inputting an image, a synthetic image is generated. It can be learned from FIG. 4b that when the synthetic image is presented in a new pose, facial features, hair styles, and clothing texture of a model of an input image can further be embodied, achieving an objective of improving missing/weakened detail information in a coarse image, thereby realizing a technical effect of improving a sense of reality of a synthetic image.

The image processing method provided in this embodiment of the specification is merely described by using the foregoing embodiment as an example, and is subject to implementing the image processing method provided by this embodiment of the specification. The specific image processing method is not limited herein.

In this embodiment of the specification, an input source image is reused for extracting texture code, a guidance including spatial information is provided by reusing a content feature map obtained according to the source image, a target pose, and a source pose, and the source pose and texture information are obtained according to the source image. A first synthetic image is obtained according to the source image, the target pose, and the source pose, a residual map is obtained according to the texture information and the first synthetic image, and a second synthetic image is obtained according to the first synthetic image and the residual map, thereby improving missing/weakened detail information in a coarse image, achieving a technical effect of improving a sense of reality of a synthetic image, and further resolving the technical problem of lacking a sense of reality in a synthetic image due to loss of texture details in feature extraction during character action transfer in the existing technologies.

In an embodiment, the obtaining a source pose and texture information according to a source image in step S302 includes the following steps.

Step S3021: Obtain a source pose of the source image through pose estimation according to the source image.

Step S3022: Obtain texture information of the source image by performing feature extraction on the source image.

Feature extraction is performed on the source image through a deep learning network, to obtain the texture information. The texture information is embodied by using texture code. That is, convolution, residual, and average sampling processing may be performed on the source image, to obtain the texture code of the source image.

In an embodiment, the obtaining a first synthetic image according to the source image, a target pose, and the source pose in step S304 includes: according to the source image, the target pose, and the source pose, obtaining a content feature map; and according to the content feature map, obtaining the first synthetic image.

By reusing the source image and encoding according to the source image, the source pose obtained according to the source image, and a pre-obtained target pose, a content feature map is obtained. The encoding process may be as follows: An input includes two branches, one branch is a source image I_s, and the other branch is a source pose P_s combined with a target pose P_t. The two branches are independently pre-processed to obtain initial code, and then are both input into a PATN module for information fusion and mutual guiding, and a content feature map is finally output.

Decoding is performed based on the content feature map, to obtain a coarse image, that is, the first synthetic image in this embodiment of the specification. The process of decoding based on the content feature map to obtain a coarse image may be as follows: After at least one layer of convolution and upsampling, intermediate features obtained through learning from a convolutional network are fused, and a spatial size of a feature map is made consistent with an input image. An output is compressed to a range of [−1, 1], and then transformed to an RGB value ranging from 0 to 255 for display, to obtain the coarse image.

In an embodiment, the obtaining a residual map according to the texture information and the first synthetic image in step S306 includes followings.

Step S3061: Perform normalization processing according to texture code and a content feature map, to obtain the residual map. Performing normalization processing according to texture code and the content feature map, to obtain the residual map includes: by performing deep learning on the texture code and normalizing the texture code on which the deep learning has been performed and the content feature map, the residual map is obtained after reconstruction, where the residual map includes contour features and surface texture details in the source image.

Deep learning is performed on the texture code to adjust dimensions of the texture code to sizes needed by a network, without affecting information included in the texture code. Then, the texture code on which deep learning has been performed and the content feature map are normalized, to control a mean value and a variance of depth features, thereby achieving transfer and transformation of a "style". The normalization processing in this embodiment of the specification may be obtained through adaptive instance normalization (AdaIN) processing.

Finally, features extracted by a convolutional neural network are recovered into an image through deconvolution, resolution is improved while a general structure of the image is maintained, and features of different layers are fused, to obtain the residual map.

Further, in an embodiment, the contour features include at least one of: a human face, an animal head, a body feature, or an appearance feature of an article. The surface texture details include commodity surface texture details, where the commodity surface texture details include at least one of: clothing texture details, accessory texture details, or tool texture details.

In this embodiment of the specification, still using the source image of the model wearing to-be-sold clothing as an example, the residual map obtained after the processing in step S3061 is an image including a human face and clothing texture details. The human face herein is a type of contour features, and the clothing texture details are a type of surface texture details.

If the source image is an image of a pet product, for example, an image of a dog wearing a pet raincoat, the residual map obtained through step S3061 may be an image including dog head features and/or body features, and the surface texture of the raincoat.

In an embodiment, the obtaining a second synthetic image according to the first synthetic image and the residual map in step S308 includes Step S3081: Perform superposition according to the first synthetic image and the residual map, to obtain the second synthetic image.

Further, the performing superposition according to the first synthetic image and the residual map, to obtain the second synthetic image in step S3081 includes: according to the contour features and the surface texture details in the source image in the residual map, filling at positions corresponding to the contour features and the surface texture details in the first synthetic image, to obtain the second synthetic image. Compared with the first synthetic image, the second synthetic image has the contour features and the surface texture details in the source image.

The key of the image processing method provided by this embodiment of the specification is that the input source image is reused for extracting texture code z_t, and a content feature map obtained in step S304 is reused for providing guidance including spatial information, to guide the texture enhancing module to generate proper texture at correct positions, thereby achieving a complement, that is, complementing missing texture details through generation of the proper texture, thus improving the missing/weakened detail information in the coarse image, and further significantly improving visual qualities of the synthetic image.

The spatial information is that correct texture should be generated at correct positions, for example, eyes, a nose, and a mouth may be synthesized correctly in a human face region, and proper decorations and fabric may be generated in a clothing region.

Embodiment 2

Figure 5:
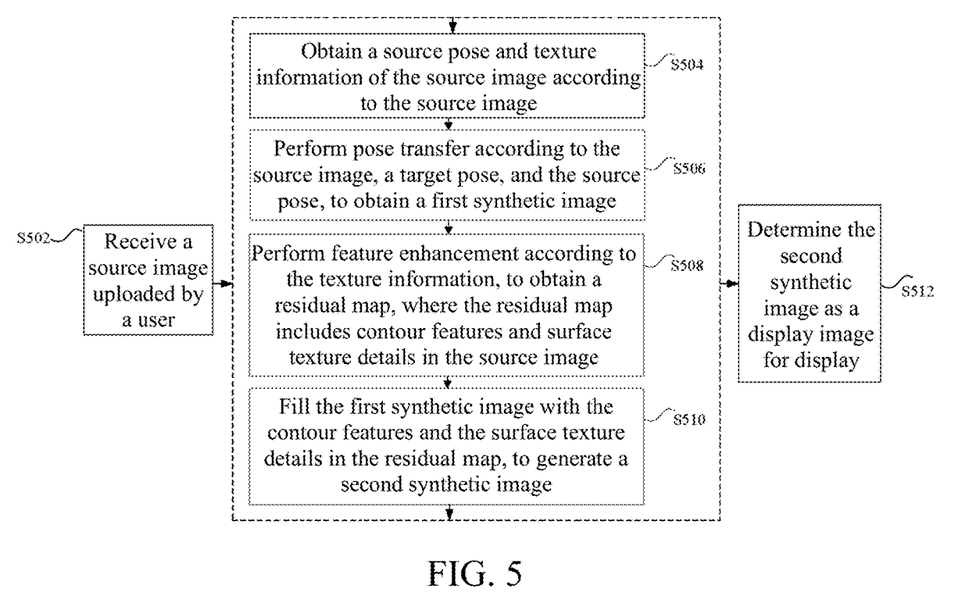
FIG. 5 is a flowchart of a data processing method, according to Embodiment 2 of the specification.

According to the embodiments of the specification, a data processing method is further provided. FIG. 5 is a flowchart of a data processing method, according to Embodiment 2 of the specification. As shown in FIG. 5, the data processing method provided by this embodiment of the specification includes the following steps.

Step S502: Receive a source image uploaded by a user.

Step S504: Obtain a source pose and texture information of the source image according to the source image.

Step S506: Perform pose transfer according to the source image, a target pose, and the source pose, to obtain a first synthetic image.

Step S508: Perform feature enhancement according to the texture information, to obtain a residual map, where the residual map includes contour features and surface texture details in the source image.

Step S510: Fill the first synthetic image with the contour features and the surface texture details in the residual map, to generate a second synthetic image.

Step S512: Determine the second synthetic image as a display image for display.

In conclusion, with reference to step S502 to step S512, the data processing method provided by this embodiment of the specification may be applicable to the field of e-commerce. For example, on a shopping website side, a seller uploads a commodity picture. If the commodity picture is a picture of a model wearing to-be-sold clothing, but the picture cannot meet requirements of generating the advertising text. In order to generate the advertising text, the clothing picture may be the source image in this embodiment of the specification. After the source image is obtained, based on the requirements of the advertising text, a target pose is obtained. Therefore, according to the source image, first, a source pose of the source image is obtained by using a pose estimation algorithm. Encoding is performed by using a pose transfer module and based on the source image, the target pose, and the source pose, to obtain a content feature map, and the content feature map is decoded by using a decoder, to obtain a coarse image, that is, a first synthetic image in this embodiment of the specification.

In addition, in the data processing method provided by this embodiment of the specification, features are extracted through a deep learning network by using the clothing picture, to obtain texture code. Using a texture enhancing module, based on the texture code, and performing adaptive instance normalization (AdaIN) on the content feature map that is obtained in the foregoing process, a residual map including a human face and clothing texture details is obtained after deconvolution (deconv).

The coarse image is combined with the residual map, for example, the residual map is superposed onto the coarse image, to obtain a repaired refined image is output, that is, a second synthetic image in this embodiment of the specification is obtained.

That is, in the foregoing manner, on the shopping website side, after the seller uploads the clothing picture, more pictures of the model wearing the to-be-sold clothing are obtained by using character pose transfer, to automatically synthesize a "seller show" video from static character images, realize transformation of e-commerce publicity "from static to dynamic", enhance advertising and display abilities of small and medium-sized merchants, promote updating and upgrading of company e-commerce platforms, and improve advertising means and product value mining.

For ease of description, the foregoing method embodiments are represented as a series of combinations of actions. To a person skilled in the art, the specification is not limited to the described order of the actions, because some steps may be performed in another order or performed simultaneously according to the specification. In addition, to a person skilled in the art, the embodiments described in the specification are some of the embodiments, and the related actions and modules are not necessarily mandatory to the specification.

According to the description of the foregoing implementations, a person skilled in the art may clearly understand that the data processing method according to the foregoing embodiments may be implemented by means of software and a necessary general hardware platform, and may be implemented by hardware. Based on the understanding, the technical solutions of the specification, or the part contributing to the related technology, may be presented in the form of a software product. The computer software product is stored in a storage medium (for example, a ROM/RAM, a magnetic disk, or an optical disc) including several instructions to enable a terminal device (which may be a mobile phone, a computer, a server, a network device, or the like) to perform the methods described in the embodiments of the specification.

Embodiment 3

Figure 6:
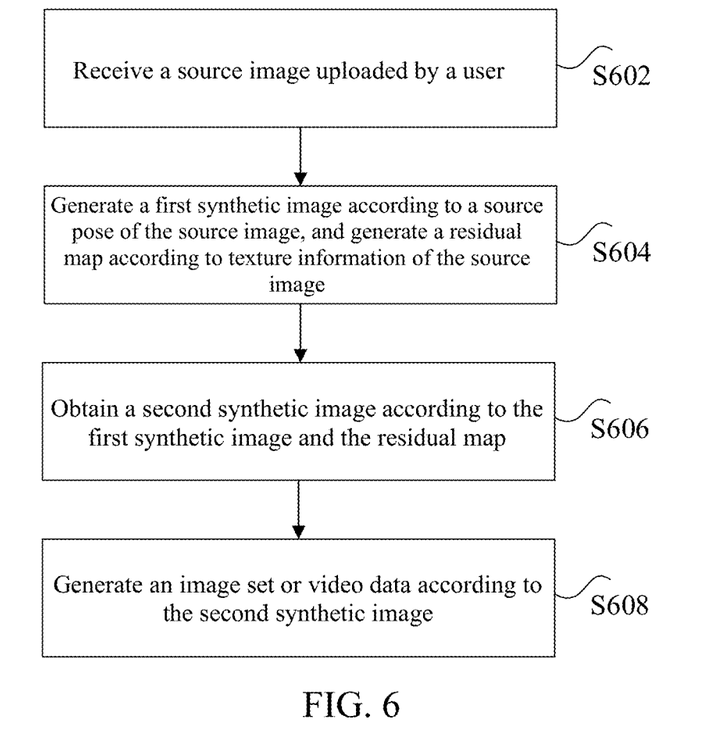
FIG. 6 is a flowchart of an image processing method, according to Embodiment 3 of the specification.

According to another embodiment of the specification, an image processing method is further provided. FIG. 6 is a flowchart of an image processing method, according to Embodiment 3 of the specification. As shown in FIG. 6, the image processing method provided in this embodiment of the specification includes the following steps.

Step S602: Receive a source image uploaded by a user.

Step S604: Generate a first synthetic image according to a source pose of the source image, and generate a residual map according to texture information of the source image.

Step S606: Obtain a second synthetic image according to the first synthetic image and the residual map.

Step S608: Generate an image set or video data according to the second synthetic image.

In an embodiment, the image set or the video data is applicable to online fitting effect display or advertisement page display.

In conclusion, with reference to step S602 to step S608, the image processing method provided by this embodiment of the specification may be applicable to the field of e-commerce. That is, on a shopping website side, for example, on a back-end server side of an online shopping platform, a commodity picture uploaded by a seller is received. If the commodity picture is a picture of a model wearing to-be-sold clothing, but the picture cannot meet requirements of generating the advertising text. In order to generate advertising text, the clothing picture may be the source image in this embodiment of the specification. After the source image is obtained, based on the requirements of the advertising text, a target pose is obtained. Therefore, according to the source image, first, a source pose of the source image is obtained by using a pose estimation algorithm. Encoding is performed by using a pose transfer module and based on the source image, the target pose, and the source pose, to obtain a content feature map, and the content feature map is decoded by using a decoder, to obtain a coarse image, that is, a first synthetic image in this embodiment of the specification.

In addition, in the image processing method provided by this embodiment of the specification, features are extracted through a deep learning network by using the clothing picture, to obtain texture code (that is, texture information in this embodiment of the specification is embodied by using the texture code). Using a texture enhancing module, based on the texture code, and performing adaptive instance normalization (AdaIN) on the content feature map, a residual map including a human face and clothing texture details is obtained after deconvolution (deconv).

The coarse image is combined with the residual map, for example, the residual map is superposed onto the coarse image, and a repaired refined image is output, that is, a second synthetic image in this embodiment of the specification is obtained.

That is, in the foregoing manner, on the shopping website side, after the seller uploads the clothing picture, more pictures of the model wearing the to-be-sold clothing are obtained by using character pose transfer, to automatically synthesize a "seller show" video from static character images (or, an advertising page consisting of a plurality of synthesized images), realize transformation of e-commerce publicity "from static to dynamic", enhance advertising and display abilities of small and medium-sized merchants, promote updating and upgrading of e-commerce platforms, and improve advertising means and product value mining.

In addition, on a buyer side, when browsing an online e-commerce website, if a user is interested in the to-be-sold clothing, an accessory, or a tool, the user can turn on a camera, and a user image is obtained by a terminal. The user image includes: facial features of the user (eyes, nose, mouth, ears, skin texture, a hair style, and a face with/without makeup), and body features of the user (a current pose of the user, for example, standing or sitting; and current clothing worn by the user). Based on the foregoing obtained user image, a server synthesizes an image of the user wearing or holding the to-be-sold clothing, accessory, or tool, and generates a plurality of images or videos according to the image. The plurality of images or videos are fed back to a client terminal to be browsed by the user, for the user to comprehensively know and experience wearing effects or using effects of the to-be-sold clothing, accessory, or tool in all rounds.

If the terminal used by the user is an AR device or a VR device, the generated images or videos can be adapted to the AR or VR device for display.

The image processing method provided in this embodiment of the specification is merely described by using the foregoing embodiment as an example, and is subject to implementing the image processing method provided by this embodiment of the specification. The specific image processing method is not limited herein.

In this embodiment of the specification, an input source image is reused for extracting texture code, a guidance including spatial information is provided by reusing a content feature map obtained according to the source image, a target pose, and a source pose, and the source image uploaded by a user is received. A first synthetic image and a residual map are generated according to the source pose and texture information of the source image, a second synthetic image is obtained according to the first synthetic image and the residual map, and an image set or video data is generated according to the second synthetic image, thereby improving missing/weakened detail information in a coarse image, achieving a technical effect of improving a sense of reality of a synthetic image, and further resolving the technical problem of lacking a sense of reality in a synthetic image due to loss of texture details in feature extraction during character action transfer in the existing technologies.

Embodiment 4

Figure 7:
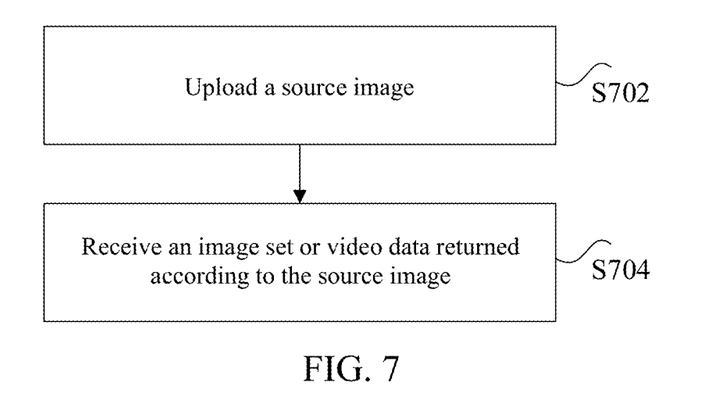
FIG. 7 is a flowchart of an image obtaining method, according to Embodiment 4 of the specification.

According to another embodiment of the specification, an image obtaining method is further provided. FIG. 7 is a flowchart of an image obtaining method, according to Embodiment 4 of the specification. As shown in FIG. 7, the image obtaining method provided in this embodiment of the specification includes following.

Step S702: Upload a source image.

Step S704: Receive an image set or video data returned according to the source image.

A first synthetic image and a residual map are generated according to a source pose and texture information of the source image, a second synthetic image is obtained according to the first synthetic image and the residual map, and the image set or the video data is obtained according to the second synthetic image.

With reference to step S702 to step S704, on a client side used by a user, the user turns on a currently used smart terminal. The smart terminal may include a terminal with a camera or a data transmission interface such as a smartphone, a notebook computer, a desktop computer, or a wearable intelligent device (for example, a smart watch, an AR device, or a VR device).

Using a smartphone as an example, the user turns on a camera of the smartphone, and a user image is obtained by a client APP installed in the smartphone. The user image includes facial features of the user (mouth, nose, eyes, ears, skin texture, a hair style, and a face with/without makeup), and body features of the user (a current pose of the user, for example, standing or sitting; and current clothing worn by the user).

If the user is interested in the to-be-sold clothing, an accessory, or a tool, through a prompt of the client APP, a current action and pose is acquired by the camera, and the image that carries the action and pose is uploaded as a source image. According to the source image, a server synthesizes an image of the user wearing or holding the to-be-sold clothing, accessory, or tool, and generates a plurality of images or videos according to the image. The plurality of images or videos are fed back to a client terminal to be browsed by the user, for the user to comprehensively know and experience wearing effects or using effects of the to-be-sold clothing, accessory, or tool in all rounds.

If the terminal used by the user is an AR device or a VR device, the generated images or videos can be adapted to the AR or VR device for display.

The image processing method provided in this embodiment of the specification is merely described by using the foregoing embodiment as an example, and is subject to implementing the image processing method provided by this embodiment of the specification. The specific image processing method is not limited herein.

In this embodiment of the specification, an input source image is reused for extracting texture code, a guidance including spatial information is provided by reusing a content feature map obtained according to the source image, a target pose, and a source pose, the source image is uploaded, and an image set or video data returned according to the source image is received, thereby improving missing/weakened detail information in a coarse image, achieving a technical effect of improving a sense of reality of a synthetic image, and further resolving the technical problem of lacking a sense of reality in a synthetic image due to loss of texture details in feature extraction during character action transfer in the existing technologies.

Embodiment 5

Figure 8:
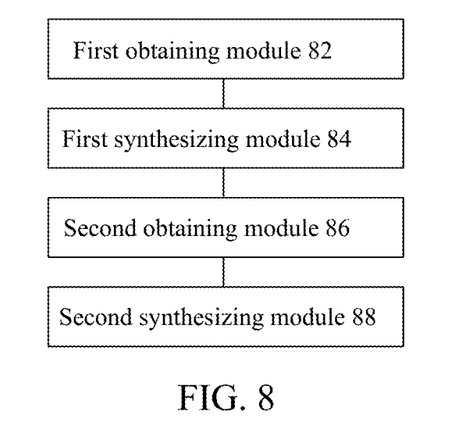
FIG. 8 is a schematic diagram of an image processing apparatus, according to Embodiment 5 of the specification.

According to the embodiments of the specification, an apparatus for implementing the image processing method in Embodiment 1 is further provided. FIG. 8 is a schematic diagram of an image processing apparatus, according to Embodiment 5 of the specification. As shown in FIG. 8, the apparatus includes: a first obtaining module 82, configured to obtain a source pose and texture information according to a source image; a first synthesizing module 84, configured to obtain a first synthetic image according to the source image, a target pose, and the source pose; a second obtaining module 86, configured to obtain a residual map according to the texture information and the first synthetic image; and a second synthesizing module 88, configured to obtain a second synthetic image according to the first synthetic image and the residual map.

Embodiment 6

Figure 9:
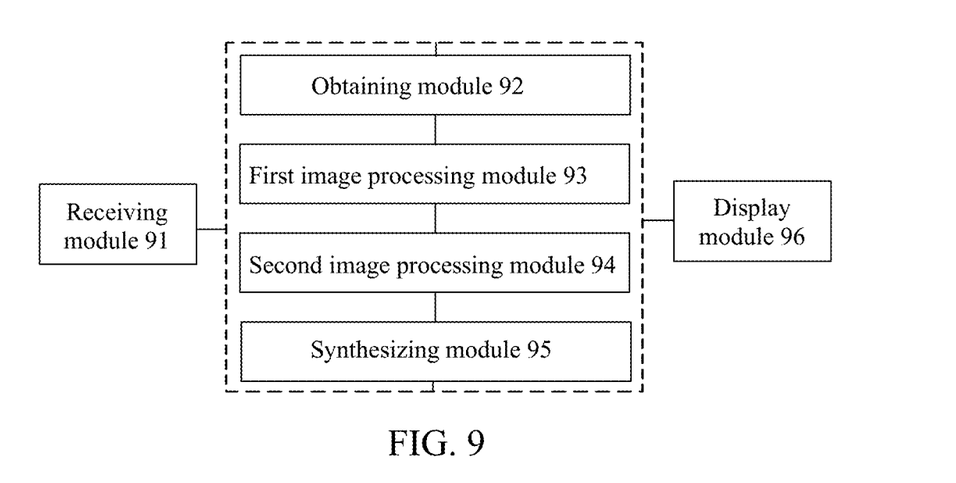
FIG. 9 is a schematic diagram of a data processing apparatus, according to Embodiment 6 of the specification.

According to the embodiments of the specification, an apparatus for implementing the data processing method in Embodiment 2 is further provided. FIG. 9 is a schematic diagram of a data processing apparatus, according to Embodiment 6 of the specification, including: a receiving module 91, configured to receive a source image uploaded by a user; an obtaining module 92, configured to obtain a source pose and texture information of the source image according to the source image; a first image processing module 93, configured to perform pose transfer according to the source image, a target pose, and the source pose, to obtain a first synthetic image; a second image processing module 94, configured to perform feature enhancement according to the texture information, to obtain a residual map, where the residual map includes contour features and surface texture details in the source image; a synthesizing module 95, configured to fill up the contour features and the surface texture details of the residual map in the first synthetic image, to generate a second synthetic image; and a display module 96, configured to determine the second synthetic image as a display image for display.

Embodiment 7

According to another embodiment of the specification, an image processing apparatus is further provided. The image processing apparatus includes: a receiving module, configured to receive a source image uploaded by a user; a first generation module, configured to generate a first synthetic image according to a source pose of the source image, and generate a residual map according to texture information of the source image; an obtaining module, configured to obtain a second synthetic image according to the first synthetic image and the residual map; and a second generation module, configured to generate an image set or video data according to the second synthetic image.

Embodiment 8

According to another embodiment of the specification, an image obtaining apparatus is further provided. The image processing apparatus includes: an upload module, configured to upload a source image; and a receiving module, configured to receive an image set or video data returned according to the source image, where a first synthetic image and a residual map are generated according to a source pose and texture information of the source image; a second synthetic image is obtained according to the first synthetic image and the residual map; and the image set or the video data is obtained according to the second synthetic image.

Embodiment 9

According to another embodiment of the specification, a storage medium is further provided. The storage medium includes a stored computer-readable program. The program, when run, controls a device including the storage medium to perform the foregoing image or data processing method in Embodiment 1 or Embodiment 2.

Embodiment 10

According to another embodiment of the specification, a processor is further provided. The processor is configured to run a computer-readable program. The computer-readable program, when run, performs the foregoing image or data processing method in Embodiment 1 or Embodiment 2.

Embodiment 11

The embodiments of the specification further provide a storage medium. In an embodiment, the storage medium may be configured to store computer-readable program code executed in the image processing method provided in the foregoing Embodiment 1.

In an embodiment, the storage medium may be located in any computer terminal in a computer terminal cluster in a computer network, or in any mobile terminal in a mobile terminal cluster.

In an embodiment, the storage medium is configured to store computer-readable program code for performing the following steps: obtaining a source pose and texture information according to a source image; obtaining a first synthetic image according to the source image, a target pose, and the source pose; obtaining a residual map according to the texture information and the first synthetic image; and obtaining a second synthetic image according to the first synthetic image and the residual map.

In an embodiment, the storage medium is configured to store computer-readable program code for performing the following steps: obtaining a source pose of the source image through pose estimation according to the source image; and obtaining texture information of the source image by performing feature extraction on the source image.

In an embodiment, the storage medium is configured to store computer-readable program code for performing the following steps: obtaining a content feature map according to the source image, the target pose, and the source pose; and obtaining the first synthetic image according to the content feature map.

In an embodiment, the storage medium is configured to store computer-readable program code for performing the following steps: performing normalization processing according to texture code and the content feature map to obtain the residual map by: performing deep learning on the texture code, normalizing the texture code on which deep learning has been performed and the content feature map, and then performing reconstruction, to obtain the residual map, where the residual map includes contour features and surface texture details in the source image.

Further, In an embodiment, the contour features include at least one of: a human face, an animal head, a body feature, or an appearance feature of an article, and the surface texture details include commodity surface texture details, where the commodity surface texture details include at least one of: clothing texture details, accessory texture details, or tool texture details.

In an embodiment, the storage medium is configured to store computer-readable program code for performing the following steps: performing superposition according to the first synthetic image and the residual map, to obtain the second synthetic image.

Further, In an embodiment, the storage medium is configured to store the computer-readable program code for performing the following steps: according to the contour features and the surface texture details in the source image in the residual map, filling the contour features and the surface texture details at positions corresponding to the contour features and the surface texture details in the first synthetic image, to obtain the second synthetic image, where compared with the first synthetic image, the second synthetic image has the contour features and the surface texture details in the source image.

The sequence numbers of the embodiments of the specification are merely for the convenience of description, and do not imply the preference among the embodiments.

In the foregoing embodiments of the specification, the description of the embodiments have respective focuses. For the part that is not detailed in an embodiment, it can be referred to the relevant description of other embodiments.

In the several embodiments provided in the specification, it should be understood that the disclosed technical content may be implemented in other manners. The foregoing described apparatus embodiments are merely examples. For example, the unit division is merely logical function division and there may be other division manners in other embodiments. For example, multiple units or components may be combined or integrated into another system, or some features may be omitted or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separated, and the parts displayed as units may or may not be physical units, may be located in one position, or may be distributed on a plurality of network units. Some or all of the units may be selected according to actual requirements to achieve the solutions of the embodiments.

In addition, functional units in the embodiments of the specification may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on this, the technical solution of the specification, the part that makes contributions to the prior art, or all or a part of the technical solution can be embodied in the form of a software product. The computer software product may be stored in a storage medium, and contain several computer-readable instructions to instruct computer equipment (for example, a personal computer, a server, or network equipment) to perform all or some steps of the method described in the embodiments of the specification. The above storage medium includes any medium that can store computer-readable program code, such as a USB flash disk, a read-only memory (ROM), a random access memory (RAM), a removable hard disk, a magnetic disk, or an optical disc.

The specification describes only some embodiments. A person of ordinary skill in the art may make various improvements and modifications without departing from the principles of the specification, and such improvements and modifications fall within the protection scope of the specification.

What is claimed is:

1. An image processing method, comprising:
obtaining a source pose and texture information according to a source image;
obtaining a first synthetic image according to the source image, a target pose, and the source pose;
obtaining a residual map according to the texture information and the first synthetic image; and
obtaining a second synthetic image according to the first synthetic image and the residual
wherein:
the obtaining the first synthetic image comprises performing pose transfer according to the source image, the target pose, and the source pose to obtain the first synthetic image; the obtaining the residual map comprises performing feature enhancement according to the texture information to obtain the residual map, wherein the residual map comprises contour features and surface texture details in the source image; the obtaining the second synthetic image comprises filling the first synthetic image with the contour features and the surface texture details in the residual map to generate the second synthetic image; and the method further comprises determining the second synthetic image as a display image for display.

2. The method of claim 1, wherein the obtaining a source pose and texture information according to a source image comprises:
obtaining the source pose of the source image through pose estimation according to the source image; and
obtaining the texture information of the source image by performing feature extraction on the source image.

3. The method of claim 1, wherein the obtaining a first synthetic image according to the source image, a target pose, and the source pose comprises:
obtaining a content feature map according to the source image, the target pose, and the source pose; and
obtaining the first synthetic image according to the content feature map.

4. The method of claim 3, wherein the obtaining a residual map according to the texture information and the first synthetic image comprises:
performing normalization processing according to a texture code and the content feature map to obtain the residual map, wherein the normalization processing comprises:
performing deep learning on the texture code, normalizing the texture code on which deep learning has been performed and the content feature map, and performing reconstruction, to obtain the residual map, wherein the residual map comprises contour features and surface texture details in the source image.

5. The method of claim 4, wherein
the contour features comprise at least one of: a human face, an animal head, a body feature, or an appearance feature of an article; and
the surface texture details comprise product surface texture details, wherein the product surface texture details comprise at least one of: clothing texture details, accessory texture details, or tool texture details.

6. The method of claim 4, wherein the obtaining a second synthetic image according to the first synthetic image and the residual map comprises:
  performing superposition according to the first synthetic image and the residual map, to obtain the second synthetic image.

7. The method of claim 6, wherein the performing superposition according to the first synthetic image and the residual map, to obtain the second synthetic image comprises:
  according to the contour features and the surface texture details of the source image in the residual map, filling the contour features and the surface texture details at corresponding positions in the first synthetic image to obtain the second synthetic image, wherein the second synthetic image has the contour features and the surface texture details in the source image.

8. The method of claim 1, further comprising:
  prior to obtaining the source pose and texture information according to the source image, receiving the source image uploaded by a user; and
  subsequent to the obtaining the second synthetic image, generating an image set or video data according to the second synthetic image.

9. The method of claim 8, wherein the image set or the video data is applicable to online fitting effect display or advertisement page display.

10. A system for image processing, comprising a processor and a non-transitory computer-readable storage medium storing instructions executable by the processor to cause the system to perform operations comprising:
  obtaining a source pose and texture information according to a source image;
  obtaining a first synthetic image according to the source image, a target pose, and the source pose;
  obtaining a residual map according to the texture information and the first synthetic image; and
  obtaining a second synthetic image according to the first synthetic image and the residual
  wherein:
  the obtaining the first synthetic image comprises performing pose transfer according to the source image, the target pose, and the source pose to obtain the first synthetic image; the obtaining the residual map comprises performing feature enhancement according to the texture information to obtain the residual map, wherein the residual map comprises contour features and surface texture details in the source image; the obtaining the second synthetic image comprises filling the first synthetic image with the contour features and the surface texture details in the residual map to generate the second synthetic image; and the operations further comprise determining the second synthetic image as a display image for display.

11. The system of claim 10, wherein the obtaining a first synthetic image according to the source image, a target pose, and the source pose comprises:
  obtaining a content feature map according to the source image, the target pose, and the source pose; and
  obtaining the first synthetic image according to the content feature map.

12. The system of claim 11, wherein the obtaining a residual map according to the texture information and the first synthetic image comprises:
  performing normalization processing according to a texture code and the content feature map to obtain the residual map, wherein the normalization processing comprises: performing deep learning on the texture code, normalizing the texture code on which deep learning has been performed and the content feature map, and performing reconstruction, to obtain the residual map, wherein the residual map comprises contour features and surface texture details in the source image.

13. The system of claim 12, wherein the obtaining a second synthetic image according to the first synthetic image and the residual map comprises:
  performing superposition according to the first synthetic image and the residual map, to obtain the second synthetic image by: according to the contour features and the surface texture details of the source image in the residual map, filling the contour features and the surface texture details at corresponding positions in the first synthetic image to obtain the second synthetic image, wherein the second synthetic image has the contour features and the surface texture details in the source image.

14. A non-transitory computer-readable storage medium for image processing, configured with instructions executable by one or more processors to cause the one or more processors to perform operations comprising:
  obtaining a source pose and texture information according to a source image;
  obtaining a first synthetic image according to the source image, a target pose, and the source pose;
  obtaining a residual map according to the texture information and the first synthetic image; and
  obtaining a second synthetic image according to the first synthetic image and the residual
  Wherein:
  the obtaining the first synthetic image comprises performing pose transfer according to the source image, the target pose, and the source pose to obtain the first synthetic image; the obtaining the residual map comprises performing feature enhancement according to the texture information to obtain the residual map, wherein the residual map comprises contour features and surface texture details in the source image; the obtaining the second synthetic image comprises filling the first synthetic image with the contour features and the surface texture details in the residual map to generate the second synthetic image; and the operations further comprise determining the second synthetic image as a display image for display.

15. The medium of claim 14, wherein the obtaining a first synthetic image according to the source image, a target pose, and the source pose comprises:
  obtaining a content feature map according to the source image, the target pose, and the source pose; and
  obtaining the first synthetic image according to the content feature map.

16. The medium of claim 15, wherein the obtaining a residual map according to the texture information and the first synthetic image comprises:
  performing normalization processing according to a texture code and the content feature map to obtain the residual map, wherein the normalization processing comprises: performing deep learning on the texture code, normalizing the texture code on which deep learning has been performed and the content feature map, and performing reconstruction, to obtain the residual map, wherein the residual map comprises contour features and surface texture details in the source image.

17. The medium of claim 16, wherein the obtaining a second synthetic image according to the first synthetic image and the residual map comprises:

performing superposition according to the first synthetic image and the residual map to obtain the second synthetic image by: according to the contour features and the surface texture details of the source image in the residual map, filling the contour features and the surface texture details at corresponding positions in the first synthetic image to obtain the second synthetic image, wherein the second synthetic image has the contour features and the surface texture details in the source image.

* * * * *

UNITED STATES PATENT AND TRADEMARK OFFICE
CERTIFICATE OF CORRECTION

| | | |
|---|---|---|
| PATENT NO. | : 11,527,056 B2 | Page 1 of 1 |
| APPLICATION NO. | : 17/186493 | |
| DATED | : December 13, 2022 | |
| INVENTOR(S) | : Lingbo Yang et al. | |

It is certified that error appears in the above-identified patent and that said Letters Patent is hereby corrected as shown below:

In the Claims

Claim 1, Column 18, Line 17:
"the residual" should read -- the residual map; --.

Claim 10, Column 19, Line 39:
"the residual" should read -- the residual map; --.

Claim 14, Column 20, Line 32:
"the residual" should read -- the residual map; --.

Signed and Sealed this
Second Day of May, 2023

Katherine Kelly Vidal
*Director of the United States Patent and Trademark Office*